(12) United States Patent
Lin et al.

(10) Patent No.: US 11,283,799 B2
(45) Date of Patent: Mar. 22, 2022

(54) TRACKABLE SHARABLE LINKS

(71) Applicant: Microsoft Technology Licensing, LLC, Redmond, WA (US)

(72) Inventors: Eugene S. Lin, Seattle, WA (US); Rafael Lopez-Uricoechea, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 16/234,896

(22) Filed: Dec. 28, 2018

(65) Prior Publication Data

US 2020/0213312 A1    Jul. 2, 2020

(51) Int. Cl.
| H04L 29/06 | (2006.01) |
| H04L 51/00 | (2022.01) |
| H04L 67/025 | (2022.01) |
| H04L 67/50 | (2022.01) |
| H04L 67/75 | (2022.01) |

(52) U.S. Cl.
CPC .............. *H04L 63/10* (2013.01); *H04L 51/14* (2013.01); *H04L 67/025* (2013.01); *H04L 67/22* (2013.01); *H04L 67/36* (2013.01)

(58) Field of Classification Search
None
See application file for complete search history.

(56) References Cited

U.S. PATENT DOCUMENTS

| 5,276,901 A | 1/1994 | Howell et al. |
| 7,376,709 B1 | 5/2008 | Brei et al. |
| 7,730,543 B1 | 6/2010 | Nath |
| 8,544,068 B2 | 9/2013 | Yates et al. |
| 8,732,853 B1 | 5/2014 | Byrne et al. |
| 8,918,867 B1 | 12/2014 | Salour |
| 9,049,176 B2 | 6/2015 | Ferdowsi et al. |
| 9,053,117 B2 | 6/2015 | Trebas et al. |

(Continued)

FOREIGN PATENT DOCUMENTS

WO    2018111377 A1    6/2018

OTHER PUBLICATIONS

"Creating Shared Links", Retrieved From: https://web.archive.org/web/20170915184814/https://community.box.com/t5/How-To-Guides-far-Sharing/Shared-Links/ta-p/19523, Jul. 25, 2016, 5 Pages.

(Continued)

*Primary Examiner* — Esther B. Henderson
(74) *Attorney, Agent, or Firm* — Christopher J. Volkmann; Helly, Holt & Christenson, PLLC

(57) ABSTRACT

A computing system configured to provide access to electronic content is provided. The computing system includes a processor and memory coupled to the processor containing instructions that when executed provide a user interface component and a link generation component. A data store is coupled to the processor and configured to store the electronic content. The user interface component is configured to receive user input requesting creation of a sharing link relative to selected electronic content stored in the data store. The user interface component is further configured to receive an indication that endpoint verification will be required for the sharing link. The link generation component is configured to responsively generate and provide a pseudo-anonymous sharing link relative to the selected electronic content.

20 Claims, 19 Drawing Sheets

ShareDrive

(56) References Cited

U.S. PATENT DOCUMENTS

| | | | |
|---|---|---|---|
| 9,208,181 B2 | 12/2015 | Pandey et al. | |
| 9,319,400 B2* | 4/2016 | Byrne | H04L 29/06809 |
| 9,338,242 B1 | 5/2016 | Suchland et al. | |
| 9,367,640 B2 | 6/2016 | Branton | |
| 9,692,840 B2 | 6/2017 | Fushman et al. | |
| 9,860,255 B2 | 1/2018 | Byrne et al. | |
| 9,934,394 B1 | 4/2018 | Stolboushkin | |
| 10,140,434 B2 | 11/2018 | Lopez-Uricoechea et al. | |
| 10,380,360 B2* | 8/2019 | Cheung | H04L 51/08 |
| 10,754,826 B2* | 8/2020 | Brand | G06F 16/176 |
| 2005/0138004 A1 | 6/2005 | Teplitsky et al. | |
| 2008/0242221 A1 | 10/2008 | Shapiro et al. | |
| 2009/0320035 A1 | 12/2009 | Ahlgren et al. | |
| 2010/0198871 A1 | 8/2010 | Stiegler et al. | |
| 2011/0258461 A1 | 10/2011 | Bates | |
| 2012/0109836 A1 | 5/2012 | Chen et al. | |
| 2012/0110474 A1 | 5/2012 | Chen et al. | |
| 2012/0136936 A1 | 5/2012 | Quintuna | |
| 2012/0284357 A1 | 11/2012 | Meisels et al. | |
| 2012/0324121 A1 | 12/2012 | Carr et al. | |
| 2013/0067303 A1 | 3/2013 | Kantor et al. | |
| 2013/0067594 A1 | 3/2013 | Kantor et al. | |
| 2013/0262559 A1 | 10/2013 | Neerings et al. | |
| 2013/0318589 A1 | 11/2013 | Ford et al. | |
| 2014/0033324 A1 | 1/2014 | Kiang et al. | |
| 2014/0067865 A1 | 3/2014 | Kirigin | |
| 2014/0067929 A1 | 3/2014 | Kirigin et al. | |
| 2014/0215551 A1 | 7/2014 | Allain et al. | |
| 2014/0215568 A1 | 7/2014 | Kirigin et al. | |
| 2014/0282901 A1 | 9/2014 | Dwan et al. | |
| 2014/0282921 A1 | 9/2014 | Filman et al. | |
| 2015/0007264 A1 | 1/2015 | Maldaner | |
| 2015/0033283 A1 | 1/2015 | Mulder | |
| 2015/0089623 A1 | 3/2015 | Sondhi et al. | |
| 2015/0135337 A1 | 5/2015 | Fushman et al. | |
| 2015/0288701 A1* | 10/2015 | Brand | H04L 63/0838 726/7 |
| 2015/0310188 A1 | 10/2015 | Ford et al. | |
| 2016/0103801 A1 | 4/2016 | Bortz et al. | |
| 2016/0314314 A1 | 10/2016 | Sirbu et al. | |
| 2017/0323086 A1 | 11/2017 | Lopez-uricoechea et al. | |
| 2017/0364692 A1 | 12/2017 | Lopez-uricoechea et al. | |
| 2018/0089451 A1 | 3/2018 | Lin | |
| 2018/0115497 A1 | 4/2018 | Lin et al. | |
| 2018/0152460 A1 | 5/2018 | Lin et al. | |
| 2018/0302441 A1 | 10/2018 | Mulder | |
| 2018/0343243 A1 | 11/2018 | Shahine et al. | |
| 2019/0147142 A1* | 5/2019 | Ge | G06F 21/10 726/26 |

OTHER PUBLICATIONS

"Google Cloud Platform", Retrieved From: http://web.archive.org/web/20150906132830/https:/cloud.google.com/storage/docs/cloud-console, Sep. 6, 2015, 16 Pages.

"OTP Verification", Retrieved From: https://www.drupal.org/project/otp_verfication, Mar. 31, 2016, 4 Pages.

"OwnCloud: OwnCloud 9.0 Server Administration Manual", Retrieved From: https://doc.owncloud.org/Server/9.0/admin_manual/configuration_files/file_sharing_configuration.html, Retrieved Date: Oct. 24, 2016, 8 Pages.

"Set File Sharing Permissions", Retrieved From: https://web.archive.org/web/20160501031008/https://support.google.com/a/answer/60781?hl=en, Retrieved on: Sep. 7, 2016. 6 Pages.

"Share files and folders", Retrieved From: https://support.google.com/docs/answer/2494822?co=GENIE.Platform%3DDesktop&hl=en&oco=1, Retrieved Date: Sep. 7, 2016, 4 Pages.

"Share Files and Folders—Zoho", Retrieved From: https://web.archive.org/web/20170519130306/https:/www.zoho.com/docs/help/secure-sharing.html, May 19, 2017, 21 Pages.

"Shared Links: Overview And FAQs", Retrieved From: https://web.archive.org/web/20150809235659/http://community.box.com:80/t5/Collaboration-and-Sharing/Shared-Links-Overview-And-FAQs/ta-p/142, Jan. 30, 2015, 6 Pages.

"Sharing a Link—Amazon WorkDocs", Retrieved From: https://web.archive.org/web/20171129011641/http:/docs.aws.amazon.com:80/workdocs/latest/userguide/web_share_link.html, Nov. 29, 2017, 2 Pages.

"Sharing Files via Link", Retrieved From: https://help.salesforce.com/articleView?id=collab_files_sharing_via_link.htm&type=5, Sep. 6, 2016, 2 Pages.

"Skyhigh Compliance", Retrieved From: https://web.archive.org/web/20160507001006/https://www.skyhighnetworks.com/skyhigh-compliance/, Sep. 9, 2016, 5 Pages.

"Squid Access Control", Retrieved From: https://web.archive.org/web/20130113061942/http://www.deckle.co.uk:80/squid-users-guide/squid-access-control-and-access-control-operators.html, Jan. 13, 2013, 31 Pages.

"University of Waterloo: Records Management", Retrieved From: https://uwaterloo.ca/records-management/university-waterloo-electronic-recordkeeping-metadata, Oct. 20, 2011, 10 Pages.

"Non Final Office Action Issued in U.S. Appl. No. 15/333,587", dated Jan. 7, 2019, 23 Pages.

"Non Final Office Action Issued in U.S. Appl. No. 15/362,155", dated Sep. 20, 2018, 18 Pages.

"International Search Report and Written Opinion Issued in PCT Application No. PCT/US2017/063165", dated Feb. 21, 2018, 12 Pages.

Stevenson, et al., "Business IT: Do you use Dropbox? Here are some clever tricks", Retrieved From: http://www.bit.com.au/Guide/313558.do-you-use-dropbox-here-are-some-clever-tricks.aspx. Aug. 29, 2012, 7 Pages.

Zahavi, et al., "Links as a Service (LaaS): Guaranteed Tenant Isolation in the Shared Cloud", In Proceedings of the Symposium on Architectures for Networking and Communications Systems, Mar. 17, 2016, pp. 87-98.

"Final Office Action issued in U.S. Appl. No. 15/362,155", dated Feb. 20, 2019, 13 Pages.

"How Do You Send a Large File Using LiquidFiles?", Retrieved From: https://web.archive.org/web/20180903235049/https:www.liquidfiles.com/tour/, Sep. 3, 2018, 5 Pages.

"Lots of Features, Still Easy to Use", Retrieved From: https://web.archive.org/web/20180903171346/https://www.liquidfiles.com/features.html, Sep. 3, 2018, 7 Pages.

B., Andy, "How Do You Support External Users?". Retrieved From: https://forum.liquidfiles.com/threads/how-do-you-support-external-users.789/, Jun. 19, 2017, 3 Pages.

"International Search Report and Written Opinion Issued in PCT Application No. PCT/US19/067713", dated Apr. 7, 2020, 13 Pages.

* cited by examiner

TRACKABLE SHARABLE LINKS

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

One manner in which online electronic content is shared is by generating and distributing sharing links. Recipients of such sharing links can actuate the links to interacts with the shared content. Currently, there are two types of sharing links are used.

The first type of sharing link is an anonymous link. This link provides access to the shared content to anyone who possesses and actuates the link. While this type of link is the easiest for recipients to use, it also provides the least control to the content sharer. Moreover, the sharer and the organizational IT administrators do not have effective visibility into who is actually accessing the shared content. At best, they may know the IP address of an entity that actuates the anonymous link.

The second type of sharing link gives a specific recipient a specific permission with respect to the shared content (such as the ability to edit the content) and may also allow entities with such permissions to manage and add new permissions to the shared content. However, this type of sharing link requires end users to understand specific settings with respect to the shared content as well as how to manage such settings. Further, recipients of such specific links are unable to simply copy a link they received and forward it on to someone else and have the forwarded link function correctly. Further, common workflows such as forwarding an email thread or adding someone to an email thread would not work correctly.

Accordingly, there exists a need for a new type of sharing link that provides substantially the same ease of use of anonymous sharing links but offers improved tracking and control of the sharing links.

The discussion above is merely provided for general background information and is not intended to be used as an aid in determining the scope of the claimed subject matter.

SUMMARY

A computing system configured to provide access to electronic content is provided. The computing system includes a processor and memory coupled to the processor containing instructions that when executed provide a user interface component and a link generation component. A data store is coupled to the processor and configured to store the electronic content. The user interface component is configured to receive user input requesting creation of a sharing link relative to selected electronic content stored in the data store. The user interface component is further configured to receive an indication that endpoint verification will be required for the sharing link. The link generation component is configured to responsively generate and provide a pseudo-anonymous sharing link relative to the selected electronic content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
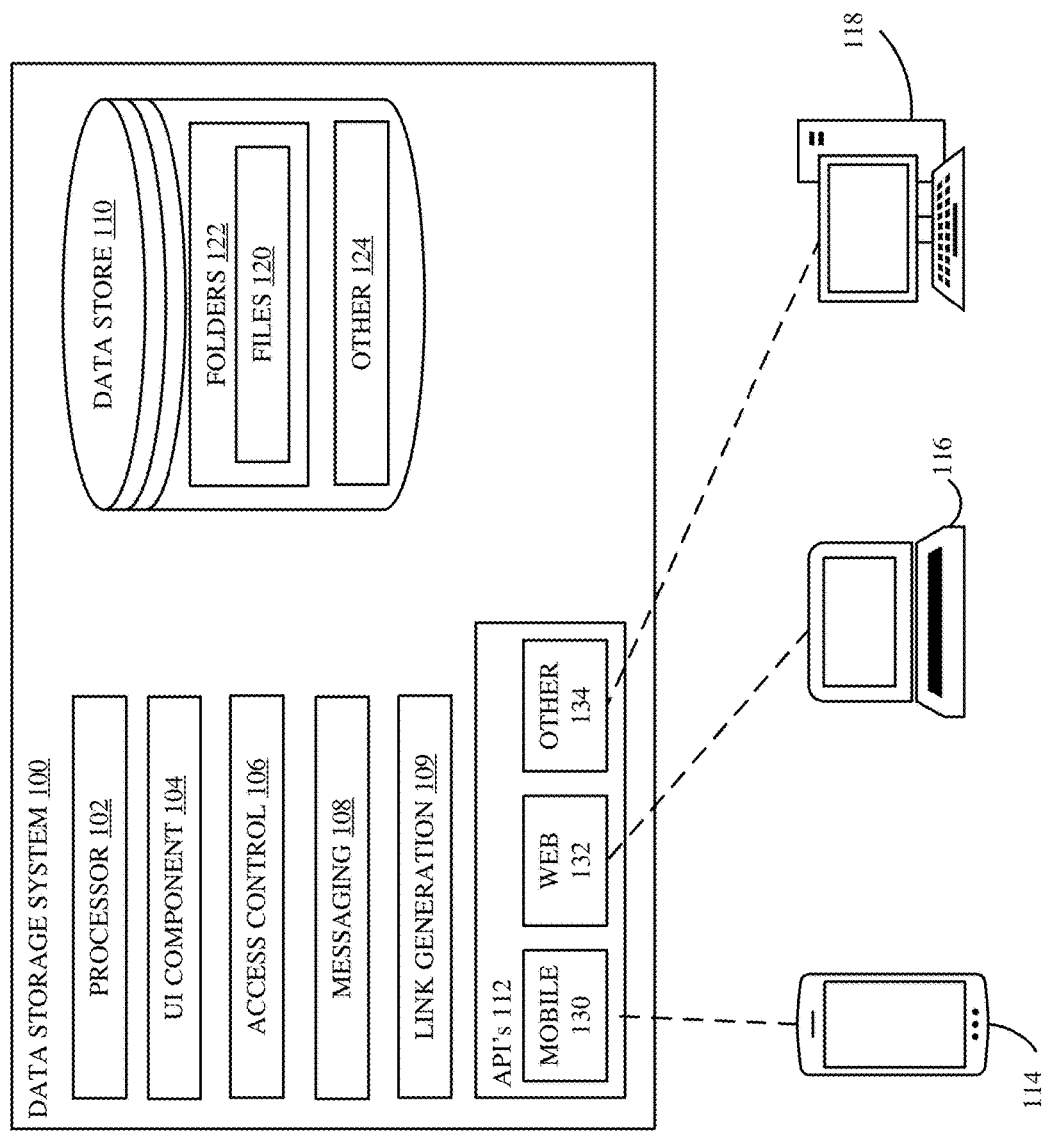
FIG. 1 is a diagrammatic view of a network-accessible data storage system with which embodiments described herein are particularly useful.

As set forth above, there exists a need for a new type of sharing link that provides substantially the same ease of use of anonymous sharing links but offers improved tracking and control of the sharing links. Embodiments described herein support a new type of link, defined herein as a pseudo-anonymous sharing link where the link will function for any user who attempts to use it and can demonstrate control of a supported endpoint (such as email, sms, telephone number, etc.). Upon proving endpoint control, the user is granted access to the shared content. In accordance with embodiments described herein, the process of challenging a user with proof of endpoint control and receiving confirmation of such endpoint control is done in a trackable manner. For example, if the communication endpoint is an email address, the recipient of the pseudo-anonymous sharable link provides an email address, that can be any email address to which the recipient has access, and then the sharing platform generates a confirmation code or information that is communicated to the address provided by the recipient. If the recipient subsequently enters the communicated code or information, control of the endpoint (email address) is valid and access to the shared content granted. By receiving the recipient's email address or other endpoint information, and storing such information, use of the pseudo-anonymous link can be tracked. As defined herein, a pseudo-anonymous sharing link is a link that will invoke the endpoint control challenge for any user of the link, and upon proof of valid endpoint control will grant access to the shared content.

While embodiments described herein generally have wide applicability to any electronic system that is able to store electronic files and allow multiple users to selectively access and share such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network in order to provide access to devices 114, 116, and 118. Each of devices 114, 116, and 118 couples to or interacts with data storage system 100 in any suitable manner, such as via API's 130, 132, 134.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

UI component 104 is illustratively controlled by other components, servers, or items in data storage provider 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

Access control component 106 is configured to perform the endpoint control challenge for recipients of pseudo-anonymous sharing links in accordance with one embodiment. Additionally, access control component 106 may maintain a list of users who have provides a valid indication of endpoint control with respect to one or more pseudo-anonymous sharing links. Further, upon completion of valid proof of endpoint control, access control component 106 can grant access to the shared content. Further still, if the user is not able to prove endpoint control via the challenge, then access control component 106 may deny access to the shared content. Additionally, when a user successfully proves endpoint control, access control component 106 may provide an indication of the endpoint and successful proof to messaging component 108 that may provide an indication of the endpoint used with respect to the pseudo-anonymous link to the original sharer, or a responsible entity, such as an IT administrator or other suitable entity.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS), phone communication abilities, or any other device or logic that is able to provide messages to users and/or communication endpoints. Further, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices. While messaging component 108 is shown as a component of data storage provider 100, it is expressly contemplated that messaging component 108 may be remote from data storage provider 100 and controlled or otherwise engaged by data storage system 100 to generate suitable messages, such as external sharing invitations.

Link generation component 109 is configured to generate pseudo-anonymous sharing links to the electronic resource stored or otherwise managed by data storage system 100. When a user selects one or more electronic resources of the data storage system and defines how the electronic resource(s) should be shared, link generation component 109 generates a link that may be distributed or communicated to allow potentially anyone to access the one or more electronic resources upon valid proof of communication endpoint control.

Data store 110 is shown as a single data store that is local to data storage provider 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users.

Figure 2:
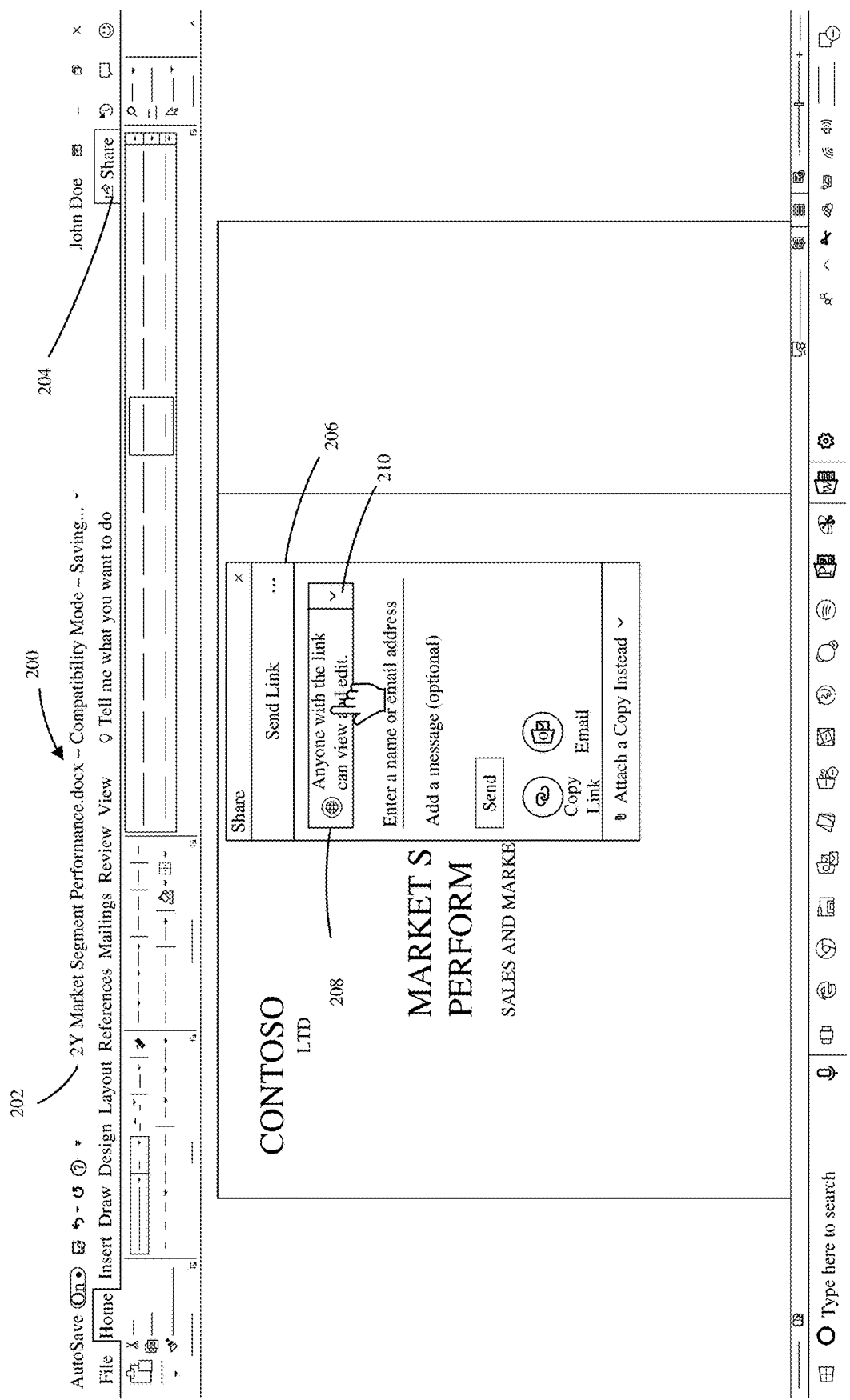
FIG. 2 is a diagrammatic screenshot illustrating the selection of a pseudo-anonymous sharing link in accordance with one embodiment.

FIG. 2 is a diagrammatic screenshot illustrating the selection of a pseudo-anonymous sharing link in accordance with one embodiment. A user (John Doe) is logged into an online storage platform and is interacting with a document entitled "2Y Market Segment Performance.docx" within user interface 200 as indicated at reference numeral 202. At some point, the user wishes to share the document with at least one other user. In order to do this, the user selects the Share tab 204 which invokes a dialog to facilitate the sharing operation. If the document is not already stored in a suitable online storage platform, the dialog may prompt the user to upload the document to the online storage platform and assist with such process. If the document is already stored in the online storage platform, dialog window 206 is provided to allow the user to select the type of sharing and configure the parameters of the sharing operation. As shown at reference numeral 208, the sharing type is provided as "anyone with the link can view and edit". These parameters may be modified if the user selects down arrow 210. When this occurs, the dialog transitions to that shown in FIG. 3.

Figure 3:
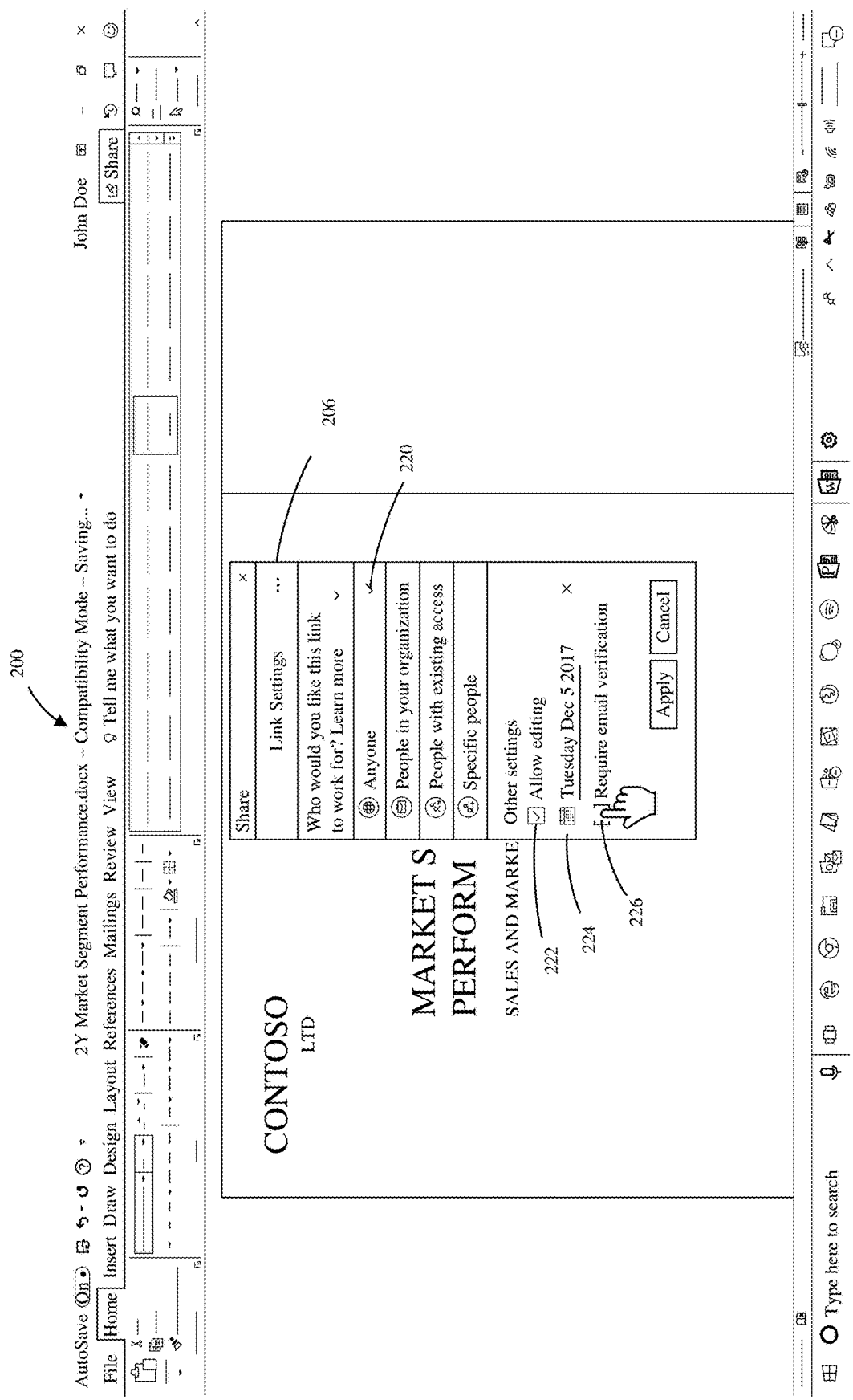
FIG. 3 is a diagrammatic screenshot illustrating the configuration of a pseudo-anonymous sharing link in accordance with one embodiment.

FIG. 3 is a diagrammatic screenshot illustrating the configuration of a pseudo-anonymous sharing link in accordance with one embodiment. As shown in FIG. 3, dialog 206 includes various types of sharing, such as sharing with anyone, sharing with people in the sharer's organization, sharing with people who have existing access and sharing with specific people. As noted, the sharer has selected the option to share with anyone as indicated by check mark 220. Additional parameters include the permission level where the user has selected check box 222 to indicate that the recipient of the pseudo-anonymous sharing link will be granted permission to edit the document. A separate parameter allows the user to specify a duration or expiration date of the sharing link as indicated at reference numeral 224 where the user has selected Tuesday Dec. 5, 2017. Additionally, the user may determine that endpoint verification should be required for the sharable link thereby transforming an otherwise anonymous sharing link into a pseudo-anonymous link in accordance with embodiments described herein. In the example shown in FIG. 3, endpoint verification is in the form of requiring the link recipient to provide email verification as indicated at reference numeral 226.

Figure 4:
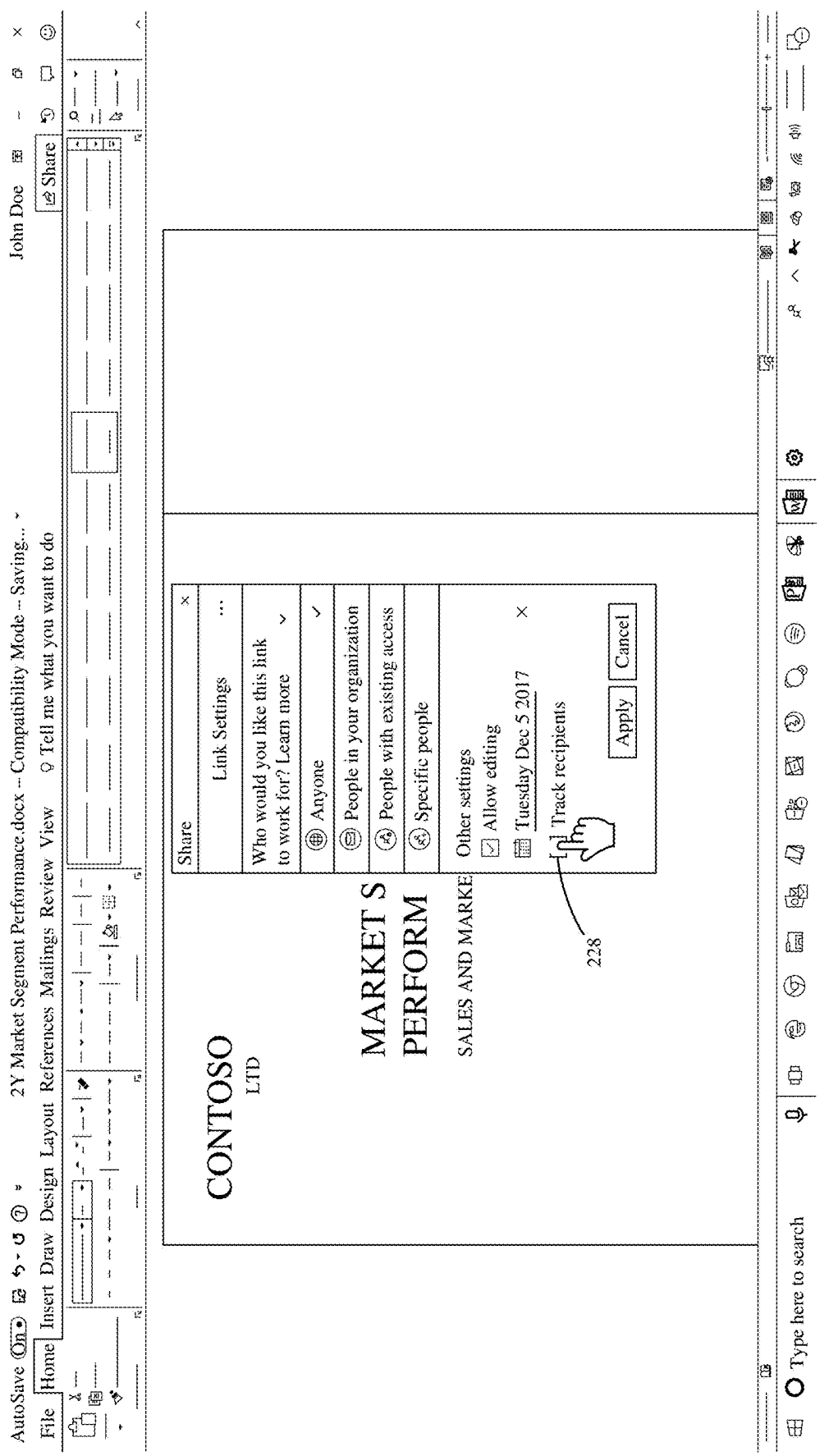
FIG. 4 is a diagrammatic screenshot illustrating the configuration of a pseudo-anonymous sharing link in accordance with another embodiment.

FIG. 4 is a diagrammatic screenshot illustrating the configuration of a pseudo-anonymous sharing link in accordance with another embodiment. As shown in FIG. 4, another parameter of the pseudo-anonymous sharing link that may be set by the sharer or responsible entity (such as IT administrator) is the tracking of recipients, as shown at reference numeral 228. When selected, the original sharer and/or responsible entity will receive a notification indicating when someone new has used the link. Such notification may include an indication of the recipient's identity as well as whether the recipient was granted access to the shared content or not. Additionally, in accordance with one embodiment, the original sharer or responsible entity may also specify certain domains that will not work with the pseudo-anonymous sharing link, for example, domains that are known to generate disposable email services.

Figure 5:
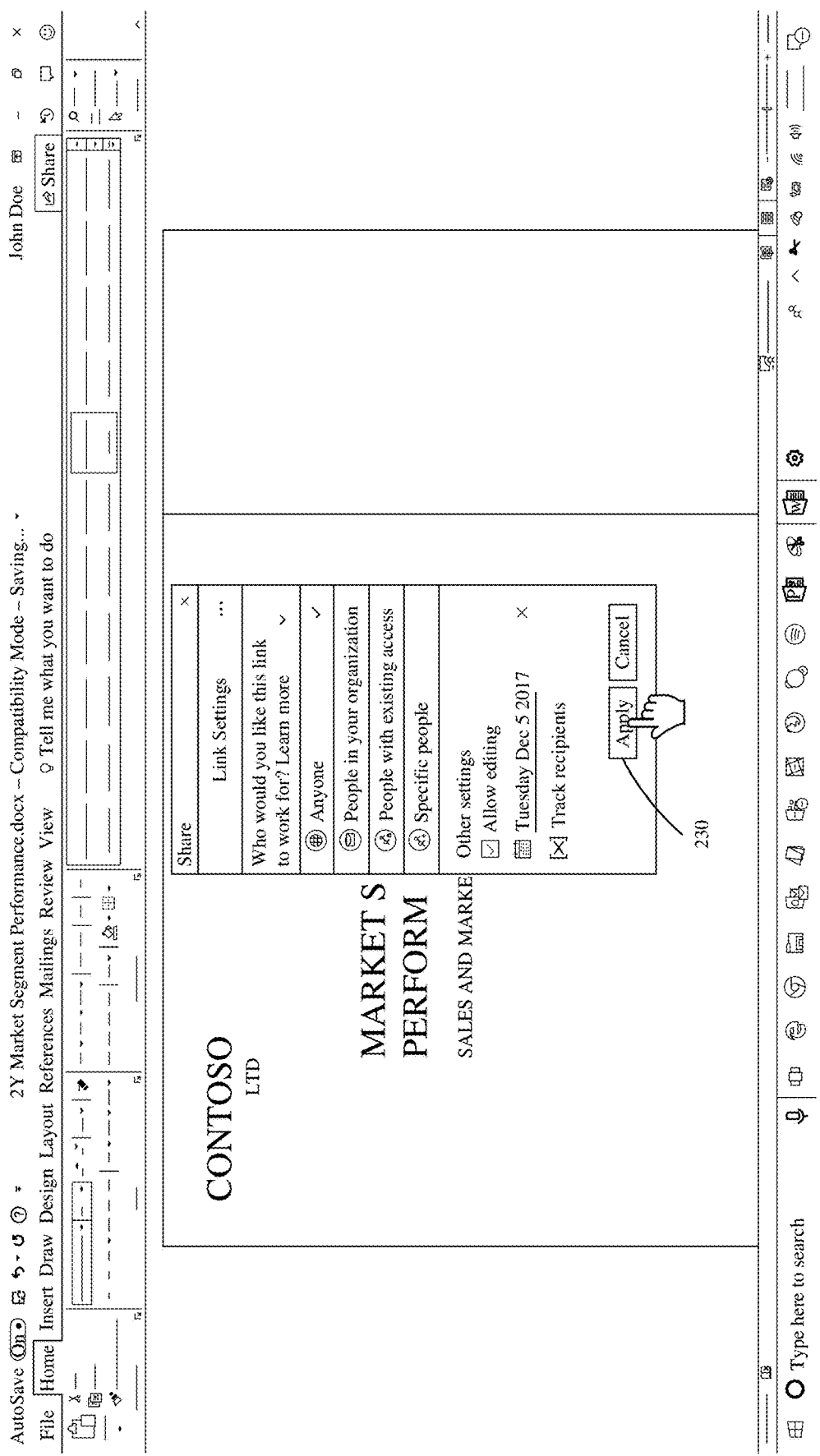
FIG. 5 is a diagrammatic screenshot illustrating the acceptance of a configured pseudo-anonymous sharing link in accordance with one embodiment.

FIG. 5 is a diagrammatic screenshot illustrating the acceptance of a configured pseudo-anonymous sharing link in accordance with one embodiment. Once the user/sharer has selected the proper type of sharing and set the requisite parameters, the user causes the system to generate the link by indicating acceptance of the settings. This is shown in FIG. 5 by the user actuating the "Apply" button 230 but may take any suitable form.

Figure 6:
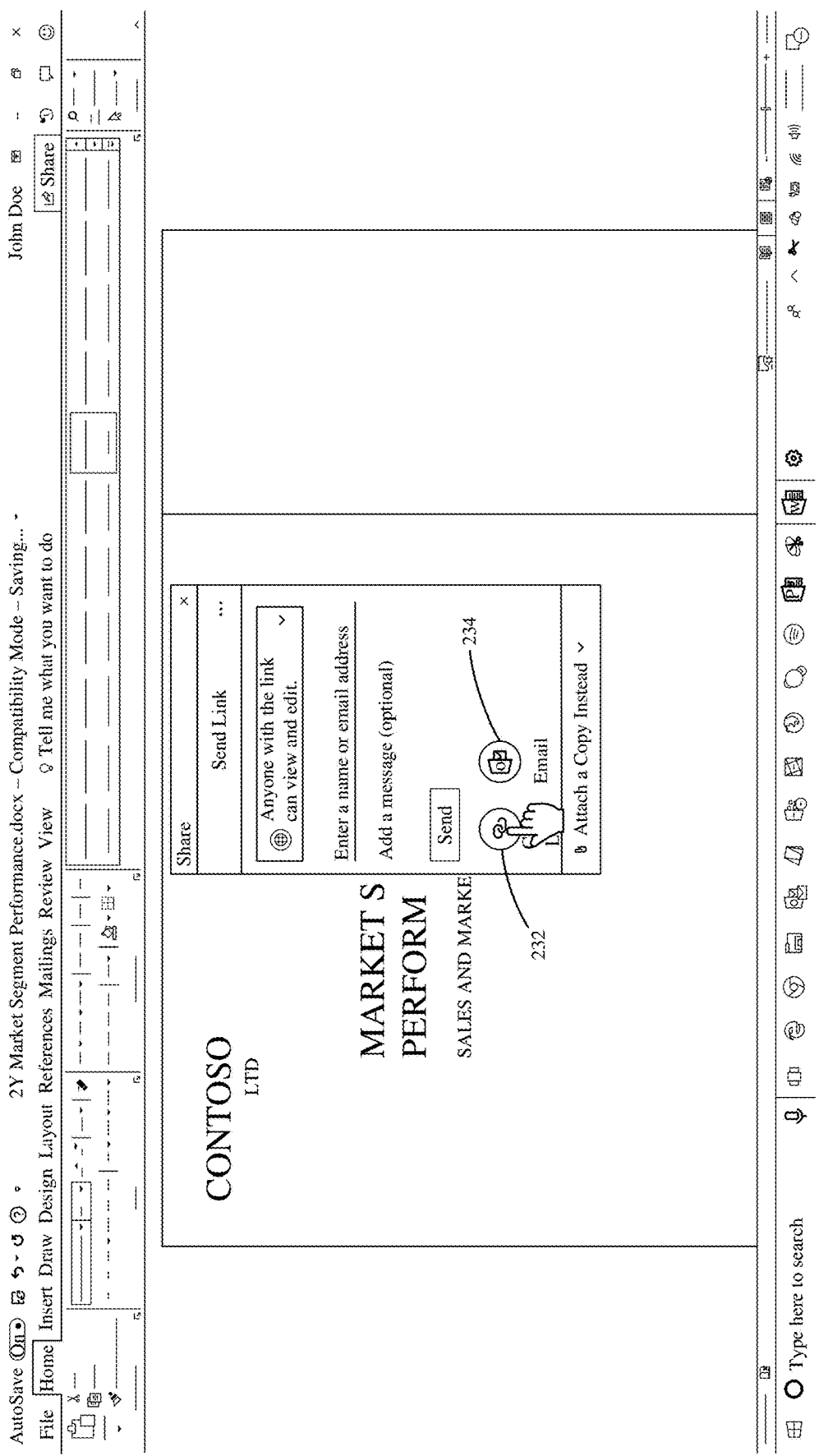
FIGS. 6 and 7 are diagrammatic screenshots illustrating delivery configuration of a pseudo-anonymous sharing link in accordance with one embodiment.
Figure 7:
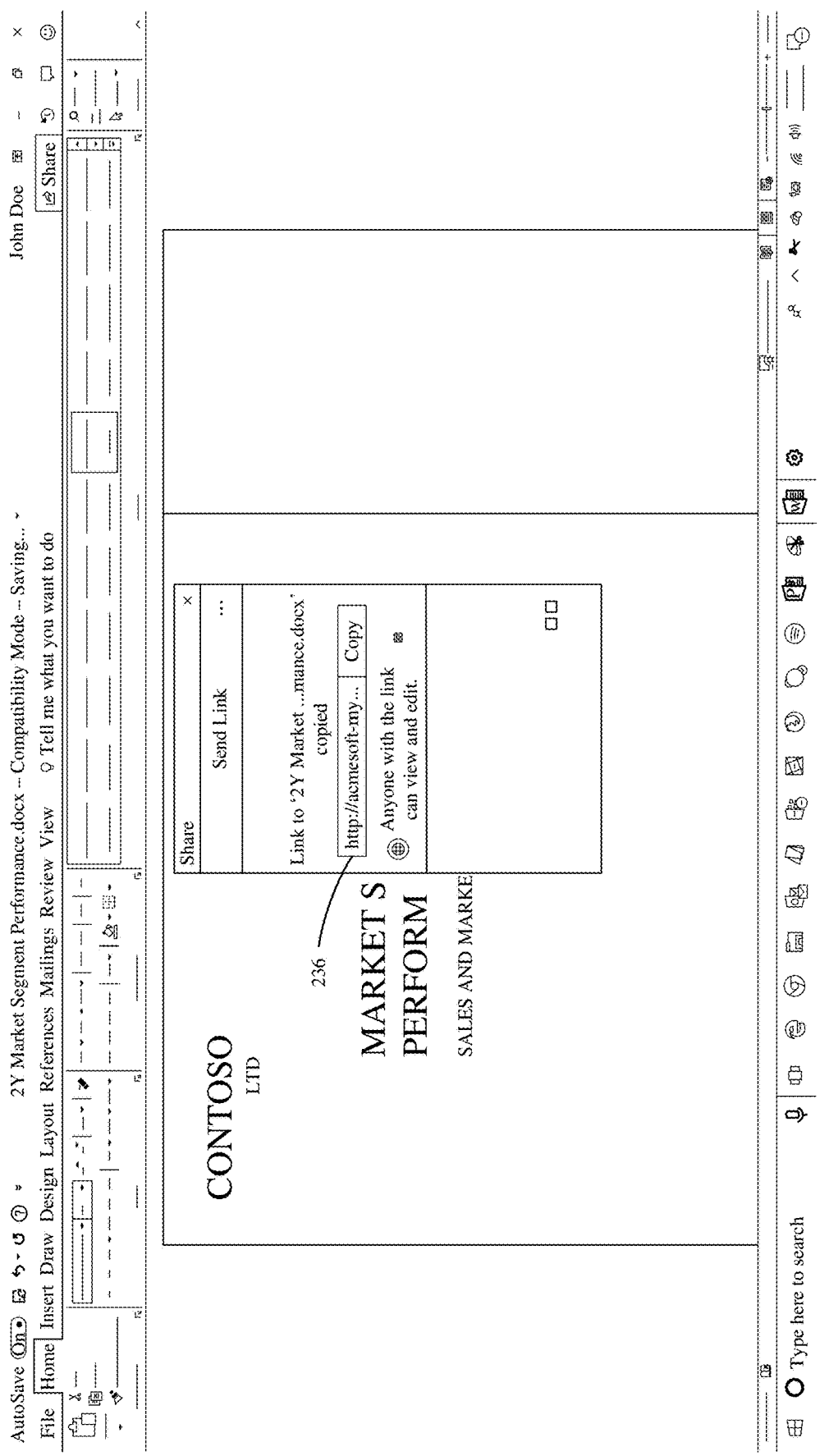

FIGS. 6 and 7 are diagrammatic screenshots illustrating delivery configuration of a pseudo-anonymous sharing link in accordance with one embodiment. As shown in FIG. 6, a user may select the copy link selector 232 or the email selector 234. If the user selects copy link selector 232, then the link will be placed in the local computer's clipboard memory so that the user may later paste or otherwise deposit the clipboard contents containing the pseudo-anonymous link. If the user selects email selector 234, the online storage platform will generate an email communication including the pseudo-anonymous link. Those skilled in the art will appreciate that other forms of communication may be used in accordance with embodiments described herein. As shown in FIG. 7, the link has been placed into sharing link window 236 for review before sending. Once the review is complete, the link is sent or otherwise transmitted to one or more recipients.

Figure 8:
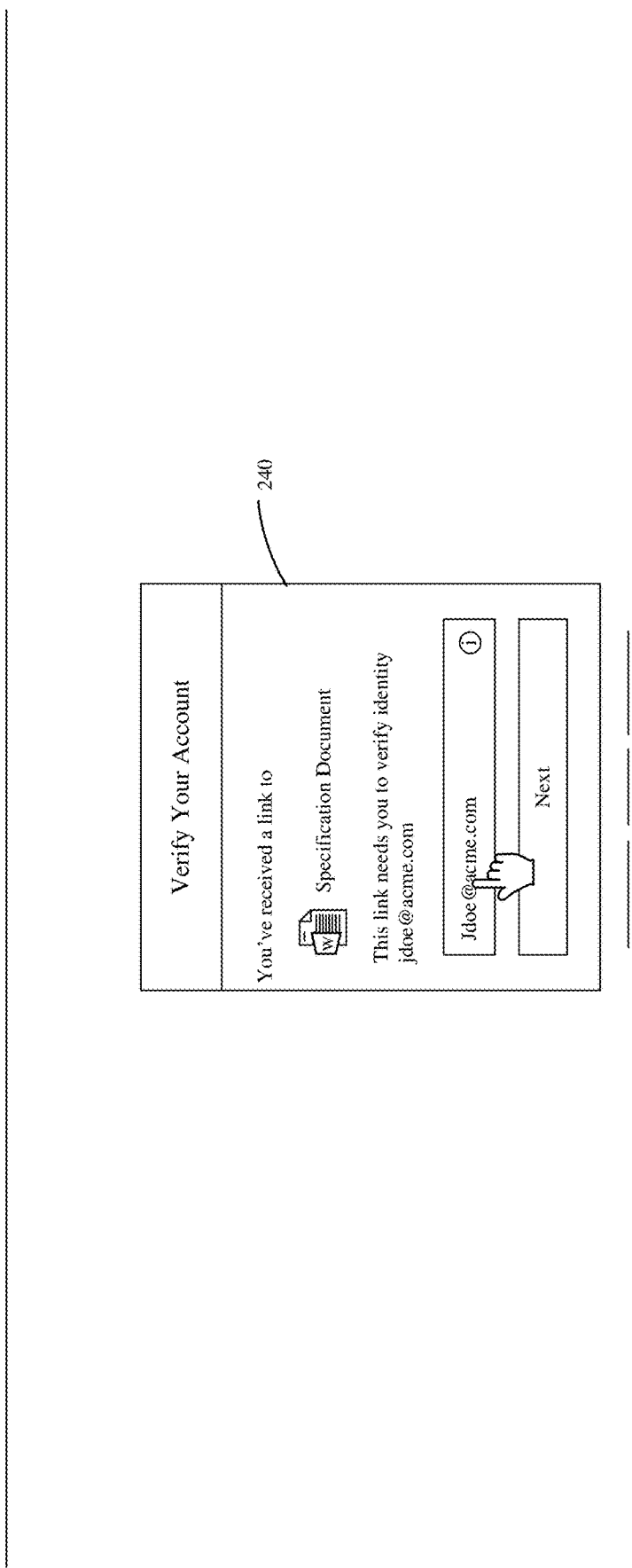
FIGS. 8 and 9 are diagrammatic screenshots illustrating user interfaces provided to a recipient of a pseudo-anonymous sharing link in accordance with one embodiment.
Figure 9:
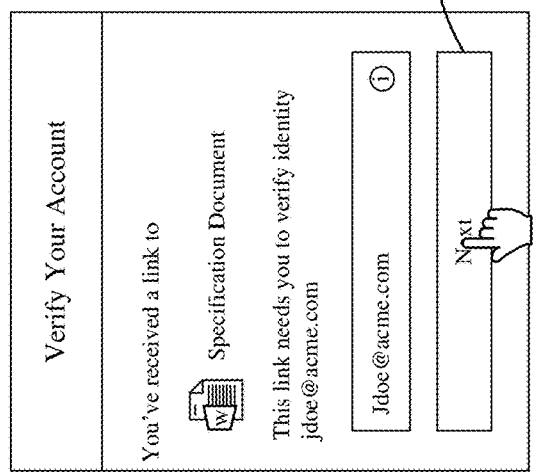

FIGS. 8 and 9 are diagrammatic screenshots illustrating user interfaces provided to a recipient of a pseudo-anonymous sharing link in accordance with one embodiment. When a recipient of a pseudo-anonymous sharing link actuates the link, access control component 106 causes user interface component 104 to generate a dialog 240 for the recipient. As shown in FIG. 8, dialog 240 indicates that the recipient must verify at least one endpoint control. In the illustrated example, the endpoint control is provided in the form of verifying control of an email address. In one embodiment, the endpoint type and/or endpoint address may be selected by the recipient of the pseudo-anonymous sharing link. For example, one recipient may select email and enter any email address for which they have access. Messaging component 108 then transmits an email to the selected email address, where the email contains a code or other information that must be entered by the recipient in order to access the shared content. In another example, a recipient may indicate that the endpoint type is a telephone number and then receive a voice call on the recipient-provided voice number, which call provides a code or other information that the recipient enters to obtain access to the shared content. As shown in FIG. 9, once the recipient has entered their endpoint type and/or address, the recipient may select "Next" button 242 to cause messaging component 108 to generate a verification code or other suitable information and transmit the verification or other suitable information to the recipient selected endpoint type and address. In the illustrated example, the recipient has entered the email address, "Jdoe@acme.com" into dialog 240 and selected "Next" button 242.

Figure 10:
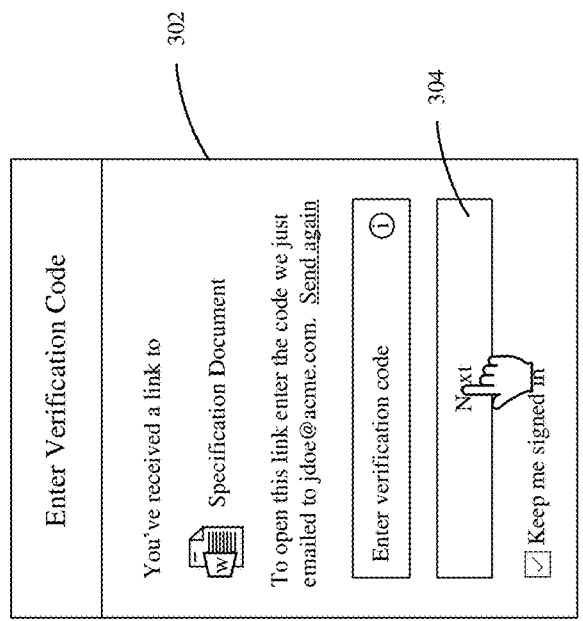
FIG. 10 is a diagrammatic screenshot illustrating a user interface provided to a link recipient in order to establish endpoint control in accordance with one embodiment.
Figure 11:
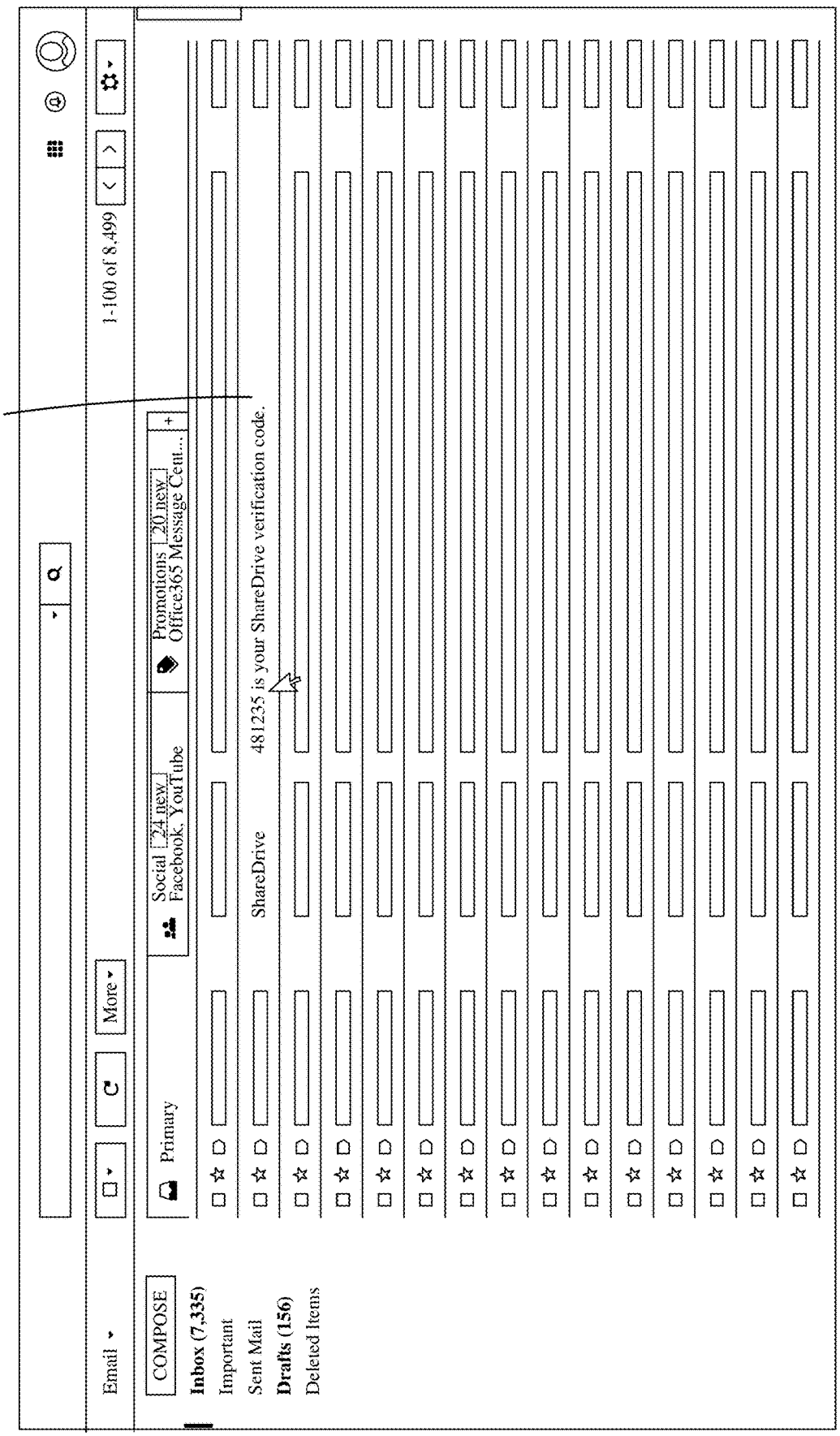
FIGS. 11 and 12 are a diagrammatic screenshot illustrating an email client application receiving a communication from an online sharing platform to establish endpoint control in order to access content shared with a pseudo-anonymous sharing link in accordance with one embodiment.
Figure 12:
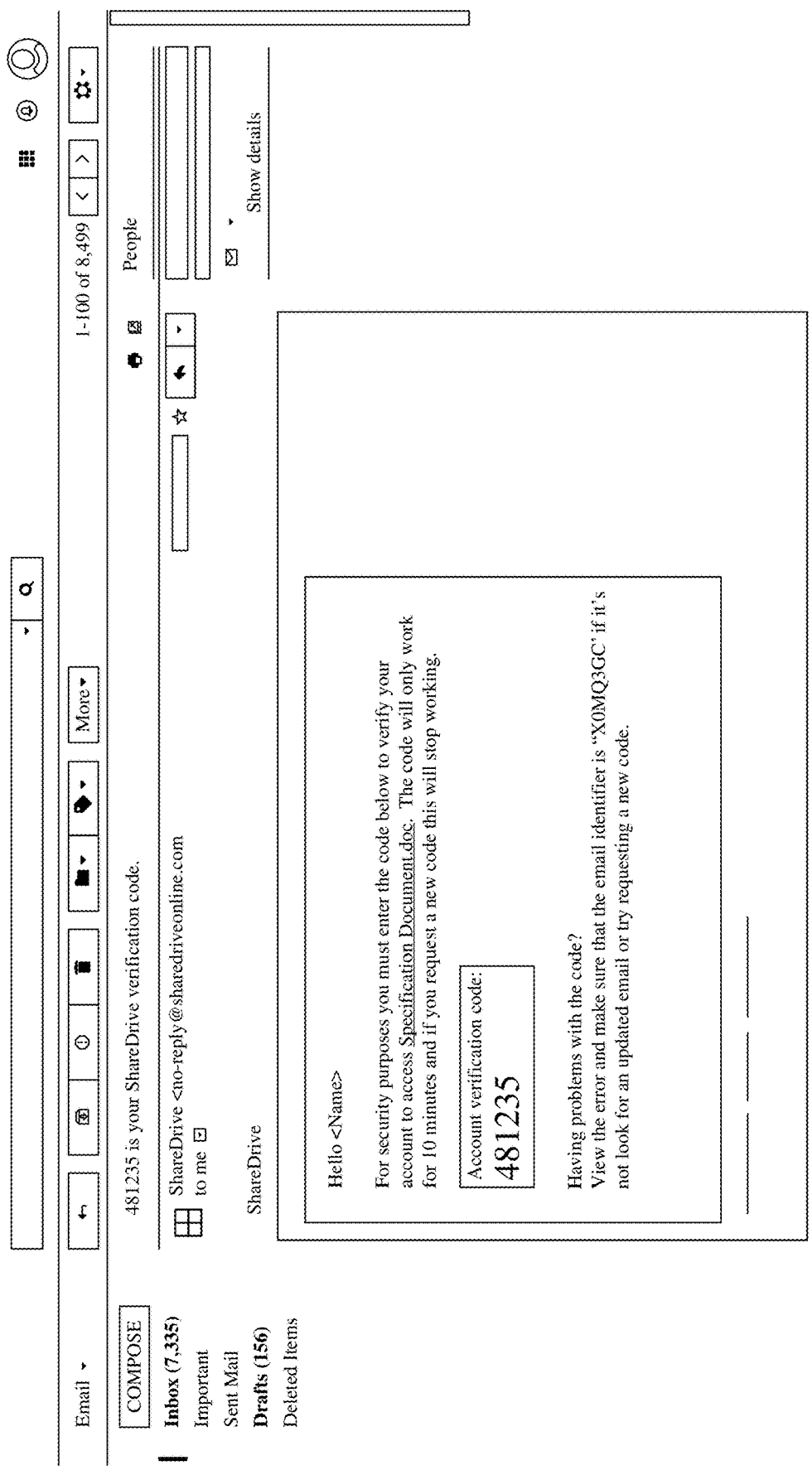
Figure 13:
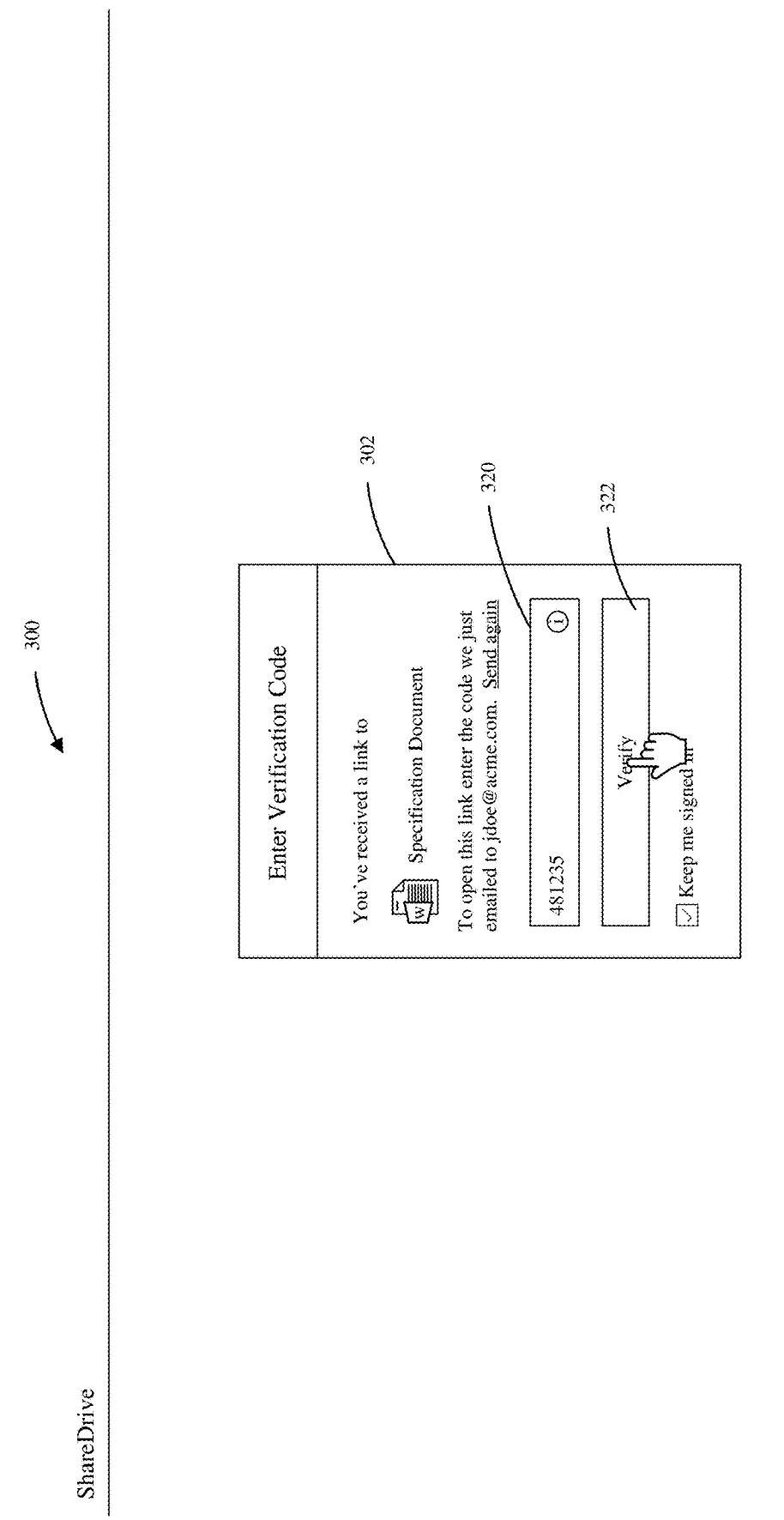
FIG. 13 is a diagrammatic screenshot illustrating endpoint control verification to access content shared with a pseudo-anonymous sharing link in accordance with one embodiment.

FIG. 10 is a diagrammatic screenshot illustrating a user interface provided to a link recipient in order to establish endpoint control in accordance with one embodiment. User interface 300 is presented to a recipient of a pseudo-anonymous sharing link when the recipient actuates or otherwise invokes the link. User interface 300 is generated by user interface component 104 at the direction of access control component 106. User interface 300 includes a box 302 that informs the recipient that to open the shared content "Specification Document" the recipient must enter a verification code that messaging component has transmitted to the recipient-provided email address "Jdoe@acme.com." Upon selecting the "Next" button, user interface 300 transitions to that shown in FIG. 13. Additionally, the recipient accesses their asserted endpoint, such as an email account, and opens the communication from data storage system 100 (shown reference numeral 306 in FIG. 11. When the message is accessed, the body of the message provides an account verification code, such as "481235" shown in FIG. 12. The recipient must then enter the received verification code into box 320 and select "Verify" 322. When the recipient has entered the verification code into box 320 and selected verify, access control component 106 determines if the entered value matches the verification code sent to the recipient by messaging component 108. If the values match, the recipient is granted access to the shared content. Additionally, upon granting access to a new recipient of the pseudo-anonymous sharing link, access control component 106 may cause messaging component 108 to generate a notification to the original sharer of the content or other responsible entity to indicate that a new recipient has accessed the shared content. The notification may indicate the identity of the recipient.

Figure 14:
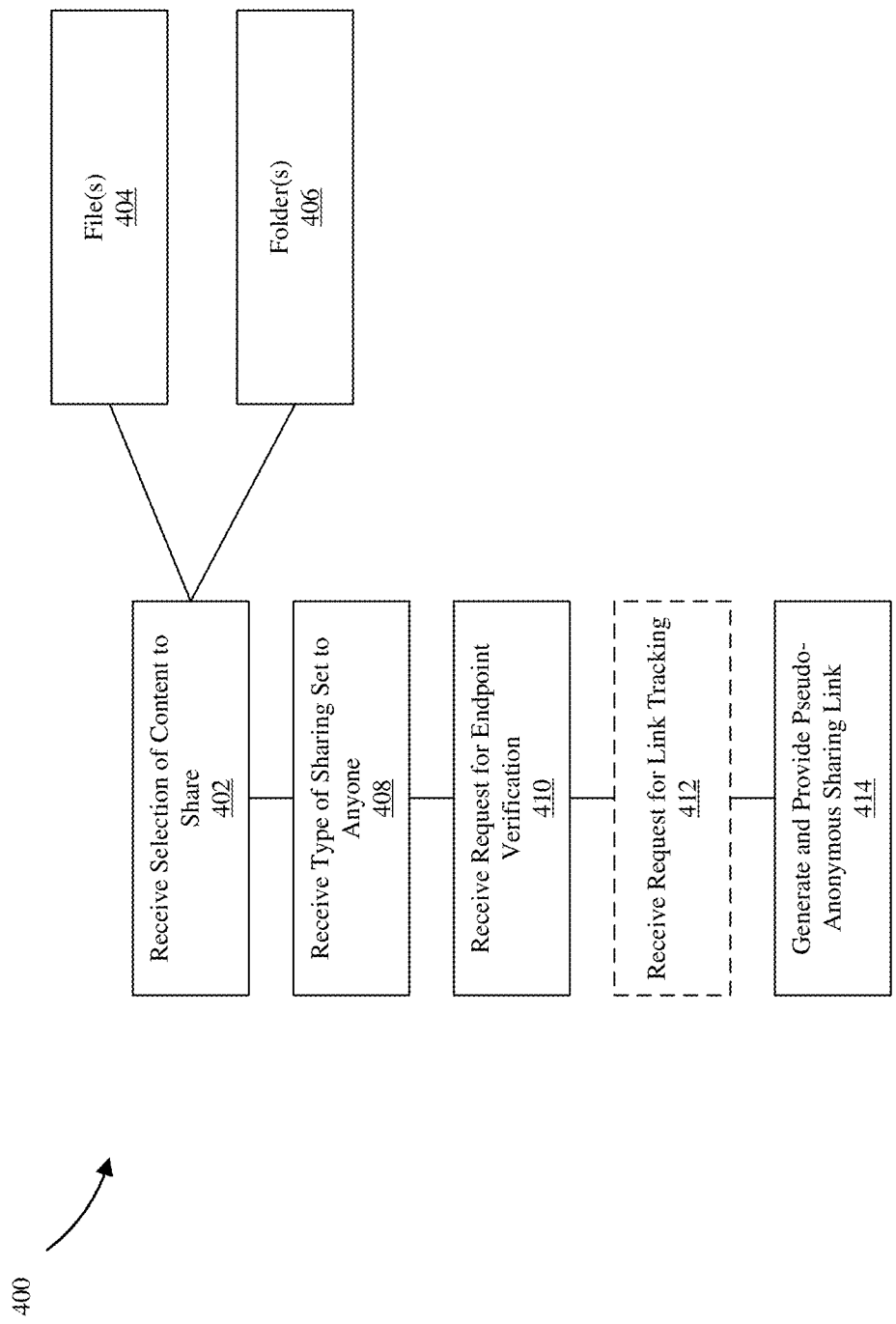
FIG. 14 is a flow diagram of a method of sharing electronic content using a pseudo-anonymous link in accordance with one embodiment.

FIG. 14 is a flow diagram of a method of sharing electronic content using a pseudo-anonymous link in accordance with one embodiment. Method 400 begins at block 402 where an owner, creator, or user who has sharing privileges with respect to the content selects the content for sharing. This selection may be of one or more files, as indicated at reference numeral 404 or one or more folders, as indicated at reference numeral 406. Once the content has been selected, control passes to block 408 where the user sets the type of sharing to be "anyone". Next, at block 410, the online sharing platform receives a sharing configuration parameter indicating that endpoint verification is required. This combination of selection of sharing with anyone and a request for endpoint verification means that the user is requesting the creation of a pseudo-anonymous sharing link with respect to the selected content. Additionally, as indicated at optional block 412, the user may also request that the pseudo-anonymous link be tracked. If such tracking is requested, online storage platform 100 will maintain a list of endpoints provided by recipients of the pseudo-anonymous link. Further, notifications of such users may also be provided to the original sharer. Next, at block 414, the pseudo-anonymous link is generated for the selected content. This link may be provided directly to the user and/or also communicated to one or more recipients identified by the user.

Figure 15:
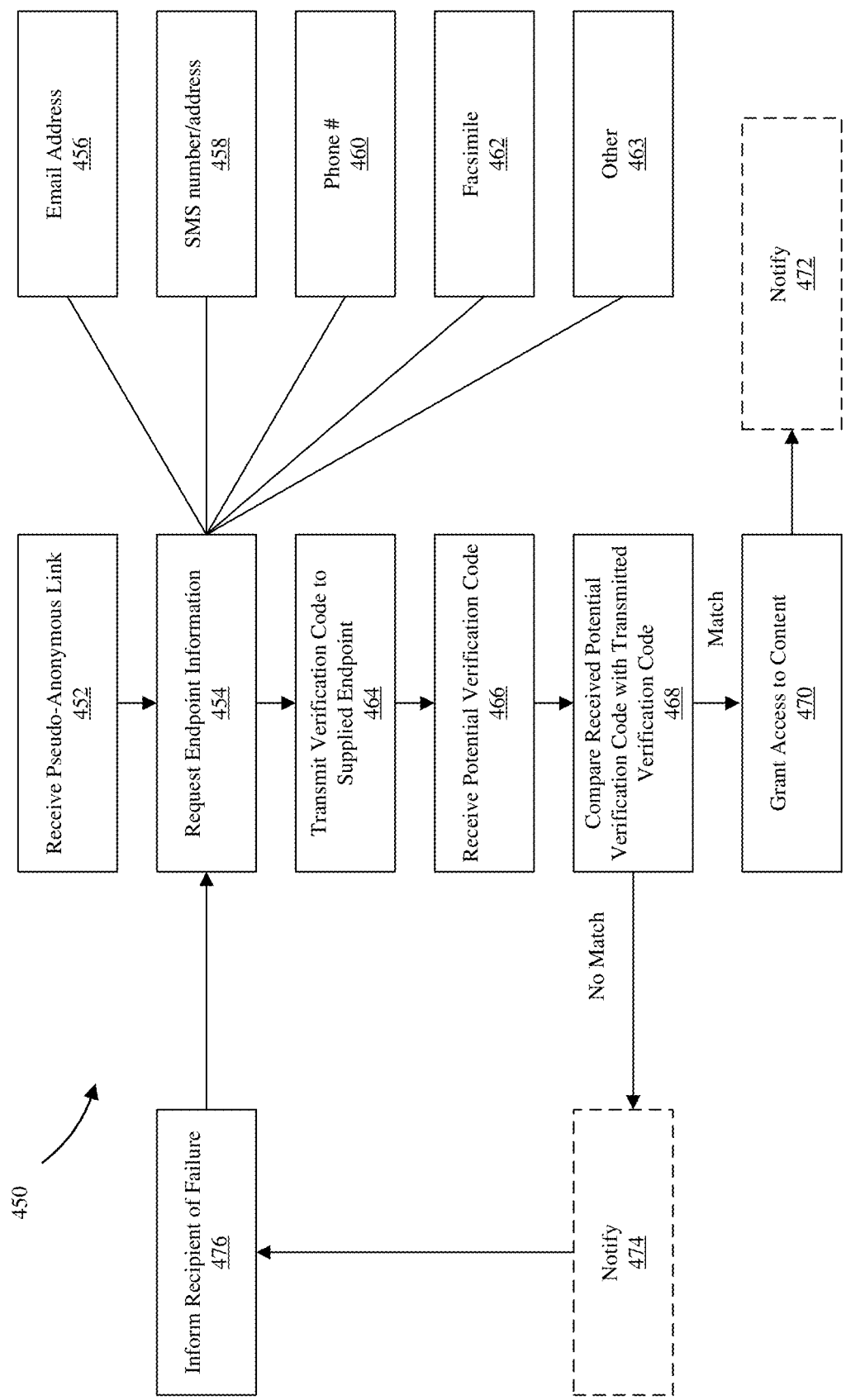
FIG. 15 is a method of controlling access to shared content with pseudo-anonymous sharing links in accordance with one embodiment.

FIG. 15 is a method of controlling access to shared content with pseudo-anonymous sharing links in accordance with one embodiment. Method 450 begins at block 452 when a recipient of a pseudo-anonymous sharing link actuates or invokes the link. When this occurs, online storage system 100, via access control component 106, receives the information set forth in the pseudo-anonymous sharing link. By analyzing the information received from the link and/or accessing metadata related to the link, access control component 106 identifies the link as a pseudo-anonymous link and begins the endpoint verification challenge. At block 454, the endpoint verification challenge begins when data storage system 100, using UI component 104 and access control component 106, generates a user interface for the recipient of the pseudo-anonymous sharing link that allows the recipient to select endpoint type and specification. For example, the recipient may be presented with a user interface box allowing such choices as email verification 456, short message service (SMS) 458, phone number verification 460, facsimile verification 462 or any other suitable endpoint 463. Additionally, once the recipient selects a type of endpoint, the recipient is provided with a user interface to specify the endpoint. For example, if the recipient selects email verification, a box will be provided to receive an email address to which the recipient has access.

At block 464, messaging component 108 generates a message to the endpoint specified by the recipient. Next, at block 466, a user interface is presented to the recipient to receive a recipient-entered verification code or information. Once the recipient has provided the input, control passes to block 468 where the recipient-provided input is compared to the verification code or information transmitted at block 464. If they match, control passes to block 470 where the recipient of the pseudo-anonymous sharing link is granted access to the shared content. Additionally, optional block 472 indicates that a notification of the access grant may be sent or otherwise provided to the original sharer or other suitable party.

If, at block 468, it is determined that the recipient provided code or information does not match the verification code or information transmitted at block 464, then the recipient is denied access to the shared content. Additionally, as indicated at optional block 474, a notification may be transmitted to the original sharer or other responsible entity indicating a failed attempt to access the shared content. Control may then pass to block 476, where the recipient is notified of the failure and potentially given another attempt to establish endpoint control verification by returning to block 454. If, however, a selected number of attempts (such as two) have failed, method 450 may terminate without granting access to the shared content.

Figure 16:
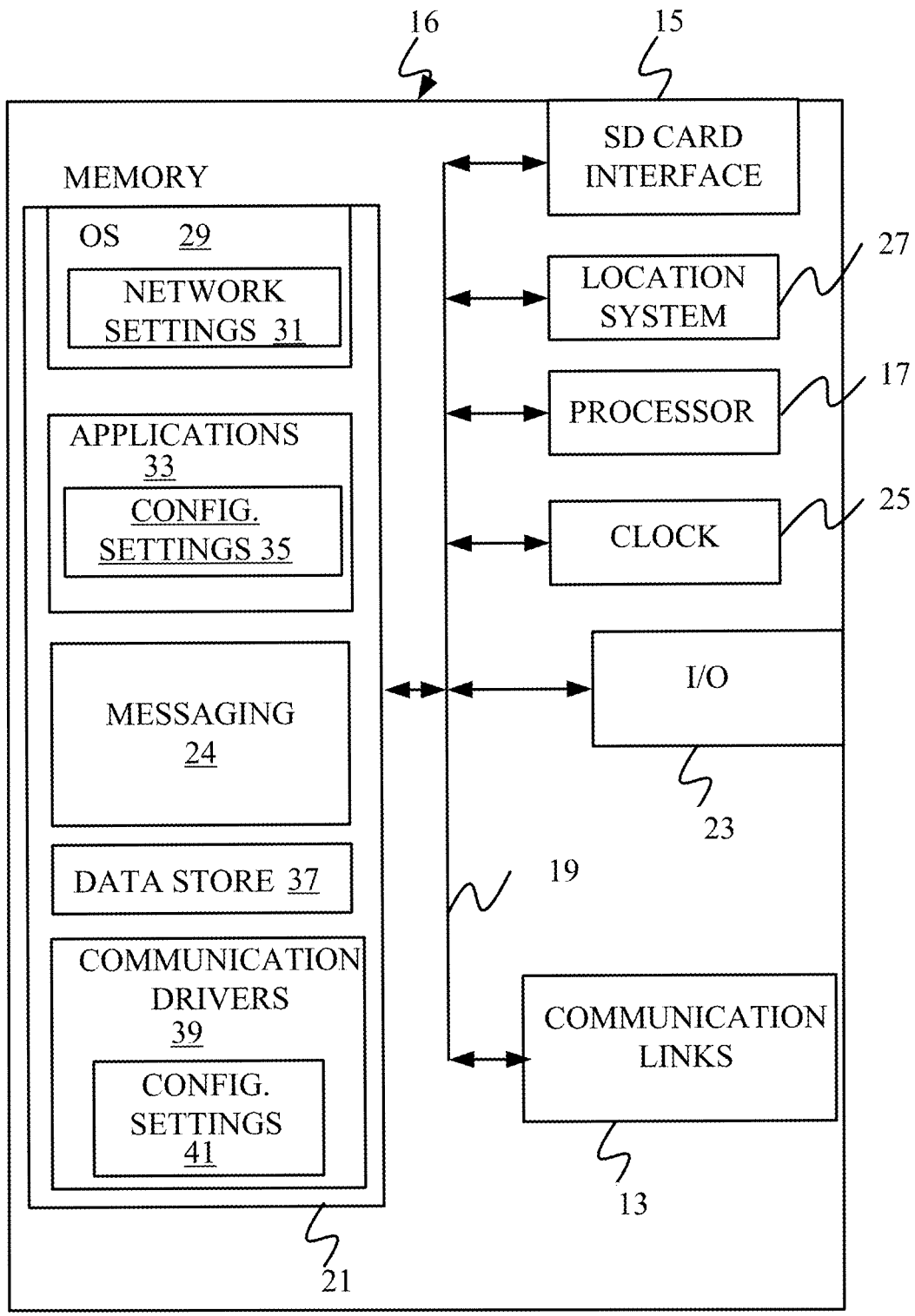
FIG. 16 provides a general block diagram of the components of a client device that can run components of the data storage system to interact with the data storage system.
Figure 17:
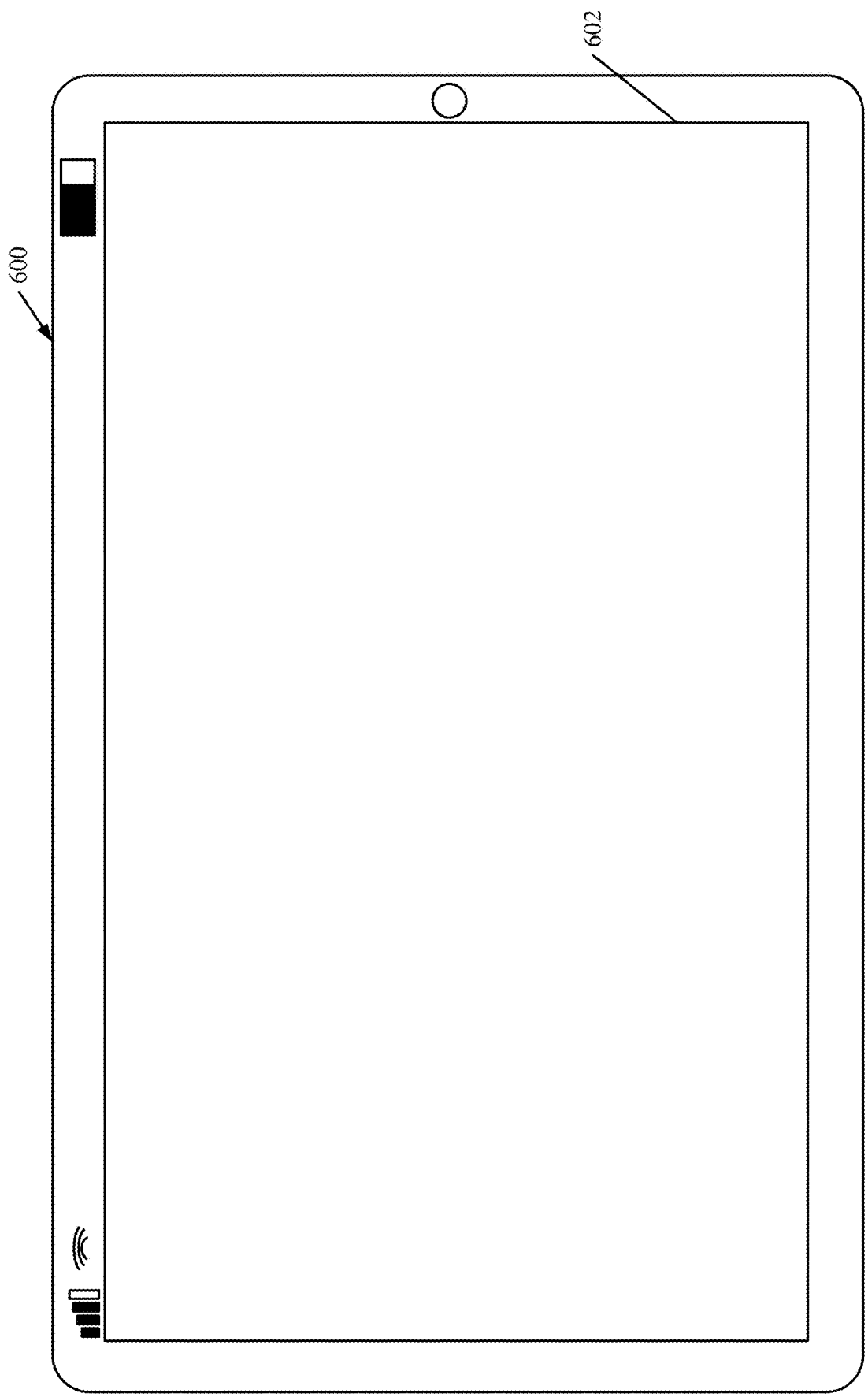
FIGS. 17 and 18 are diagrammatic views of client devices that can run components of the data storage system to interact with the data storage system.
Figure 18:
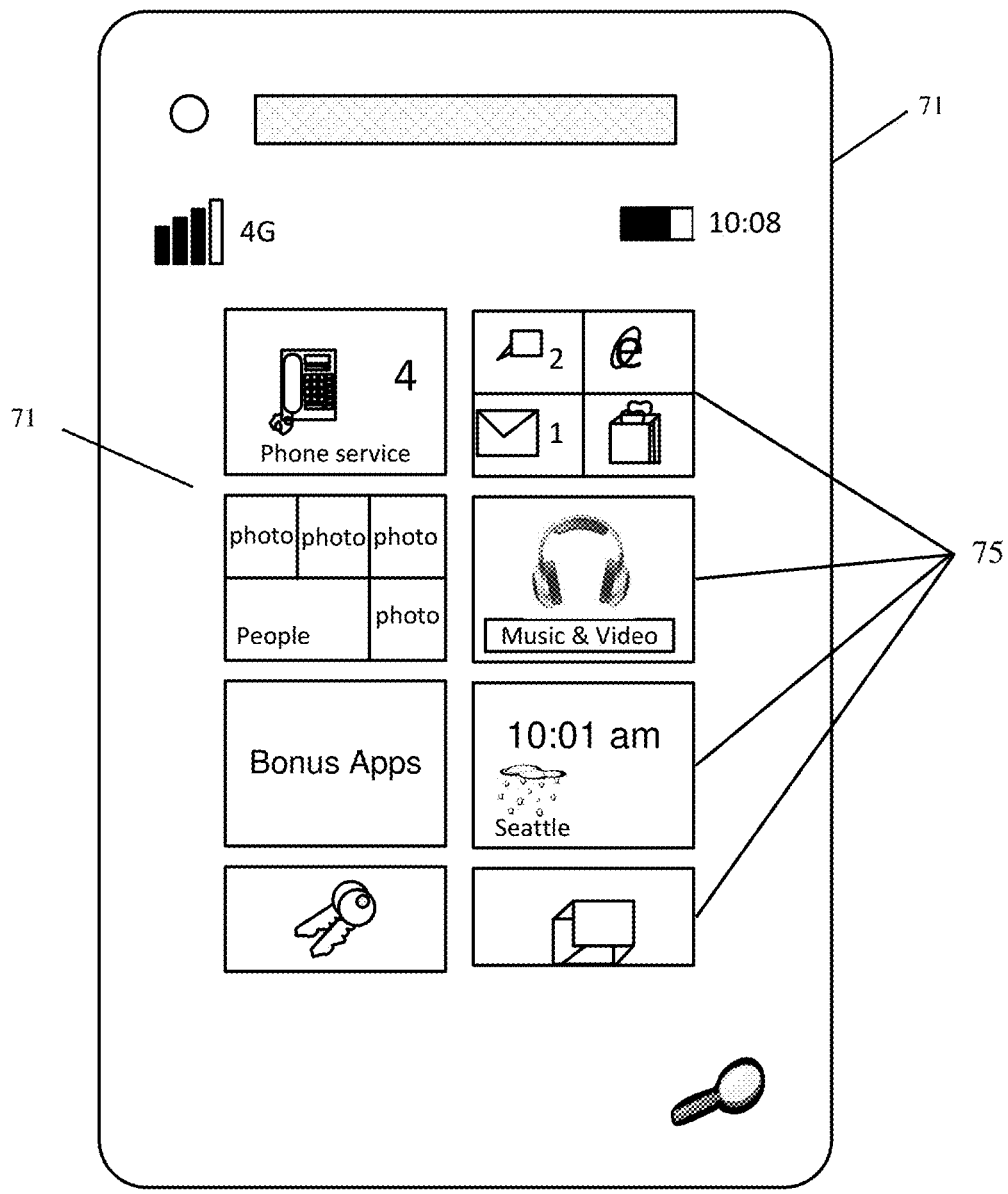

FIG. 16 is a simplified block diagram of one illustrative embodiment of a handheld or mobile computing device that can be used as a user's or client's handheld device 16, in which the present system (or parts of it) can be deployed. FIGS. 17 and 18 are examples of handheld or mobile devices.

FIG. 16 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 17 shows one embodiment in which device 16 is a tablet computer 600. In FIG. 17, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 18 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 19:
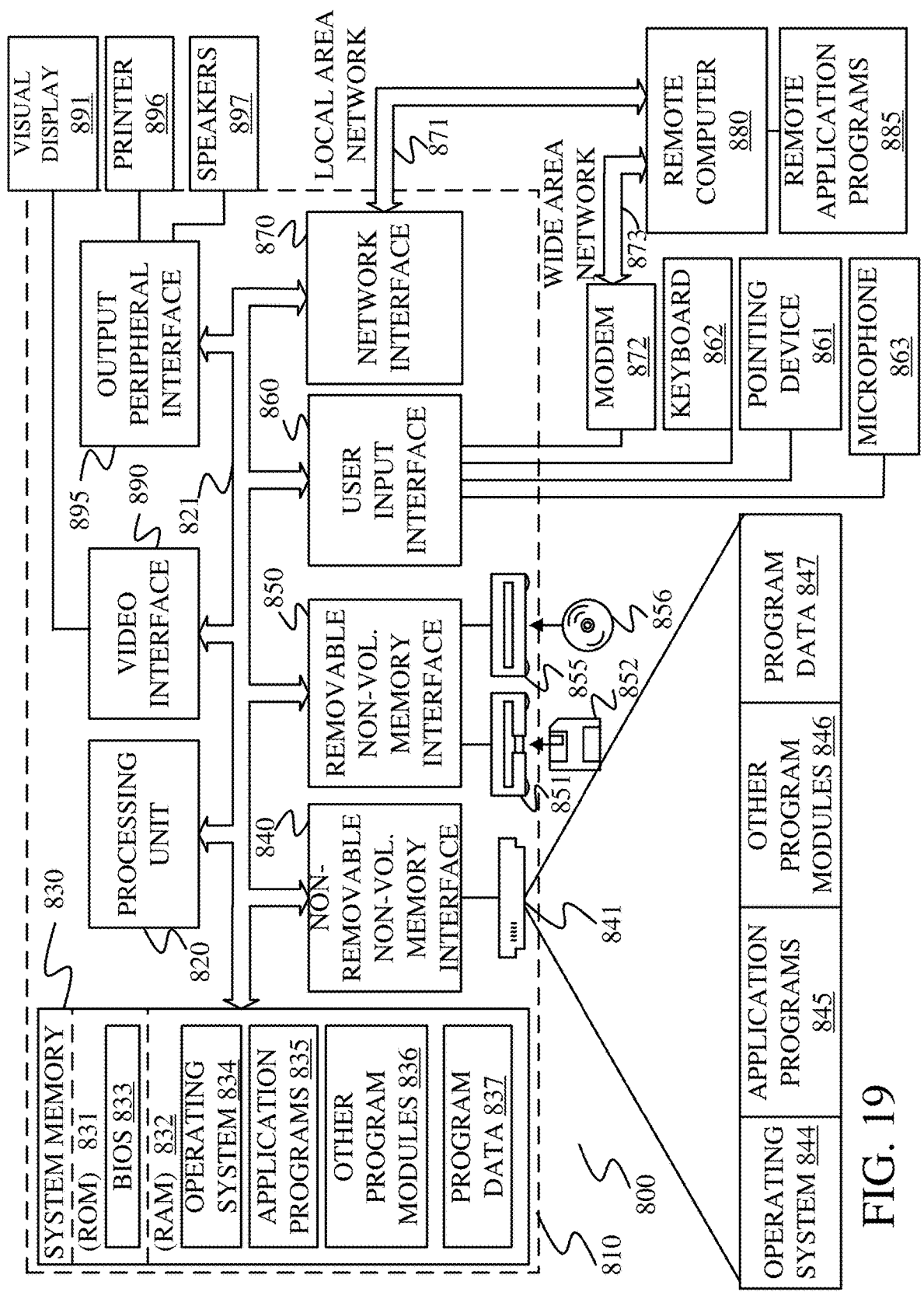
FIG. 19 is a general block diagram of a computing device that can run components of a data storage system or client device that interacts with the data access system, or both.

FIG. 19 is one embodiment of a computing environment in which architecture 100, or parts of it, (for example) can be deployed. With reference to FIG. 19, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 19 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 810. In FIG. 19, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 19 include a local area network (LAN) 871 and a wide area network (WAN) 873 but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 19 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein. Also, the figures show a number of blocks with functionality ascribed to each block. It will be noted that fewer blocks can be used so the functionality is performed by fewer components. Also, more blocks can be used with the functionality distributed among more components. The present discussion has mentioned processors and servers. In one embodiment, the processors and servers include computer processors with associated memory and timing circuitry, not separately shown. They are functional parts of the systems or devices to which they belong and are activated by, and facilitate the functionality of, the other components or items in those systems.

Example 1 is a computing system configured to provide access to electronic content. The computing system includes a processor and memory coupled to the processor containing instructions that when executed provide a user interface component and a link generation component. A data store is coupled to the processor and configured to store the electronic content. The user interface component is configured to receive user input requesting creation of a sharing link relative to selected electronic content stored in the data store. The user interface component is further configured to receive an indication that endpoint verification will be required for the sharing link. The link generation component is configured to responsively generate and provide a pseudo-anonymous sharing link relative to the selected electronic content.

Example 2 is the computing system of any or all previous examples wherein the selected content includes at least one electronic file.

Example 3 is the computing system of any or all previous examples wherein the selected content includes at least one folder.

Example 4 is the computing system of any or all previous examples wherein the pseudo-anonymous link is configured to cause the computing system to issue an endpoint verification challenge to a recipient of the pseudo-anonymous sharing link upon actuation of the pseudo-anonymous sharing link.

Example 5 is the computing system of any or all previous examples wherein endpoint verification includes email verification.

Example 6 is the computing system of any or all previous examples and further comprising a messaging component configured to transmit the pseudo-anonymous sharing link to at least one recipient.

Example 7 is the computing system of any or all previous examples wherein the user interface component is further configured to receive input requesting tracking of the pseudo-anonymous sharing link.

Example 8 is the computing system of any or all previous examples and further comprising a messaging component configured to provide a notification to a sharer of the selected electronic content when the pseudo-anonymous sharing link is used.

Example 9 is the computing system of any or all previous examples wherein the notification is indicative of the pseudo-anonymous sharing link being used successfully to access the selected electronic content, and wherein the notification includes recipient-provided endpoint information.

Example 10 is the computing system of any or all previous examples wherein the recipient-provided endpoint information includes an email address.

Example 11 is a computing system configured to provide access to electronic content. The computer system includes a processor and memory coupled to the processor and containing instructions that when executed provide a user interface component, an access control component, and a messaging component. A data store is coupled to the processor and is configured to store the electronic content. The access control component is configured to receive a pseudo-anonymous sharing link from a recipient and responsively provide an endpoint verification challenge to the recipient. The user interface component is configured to receive recipient input indicative of recipient endpoint information and verification information input. The messaging component is configured to transmit a verification code to the recipient based on the recipient endpoint information. The processor is configured to compare the verification information input received by the user interface component with the verification code transmitted by the messaging component and selectively grant access to shared electronic content based on whether the verification information input matches the verification code transmitted by the messaging component.

Example 12 is the computing system of any or all previous examples wherein the endpoint information includes an indication of endpoint type.

Example 13 is the computing system of any or all previous examples wherein the endpoint information also includes endpoint address information.

Example 14 is the computing system of any or all previous examples wherein the endpoint type is email.

Example 15 is the computing system of any or all previous examples wherein the endpoint information includes an email address and wherein the messaging component is configured to transmit the verification code as an email to the email address.

Example 16 is the computing system of any or all previous examples wherein the access control component is configured to maintain a listing of endpoints verified with respect to the pseudo-anonymous sharing link.

Example 17 is the computing system of any or all previous examples wherein the messaging system is configured to transmit a notification indicative of the endpoint information.

Example 18 is the computing system of any or all previous examples wherein the messaging system is configured to transmit a notification indicative of the endpoint information.

Example 18 is a method of providing access to shared electronic content. The method includes receiving sharer input indicative of selected electronic content and generating a pseudo-anonymous sharing link with respect to the selected electronic content. The method also includes receiving the pseudo-anonymous sharing link from a recipient of the pseudo-anonymous sharing link and requiring the recipient to specify endpoint information. A verification code is transmitted based on the recipient-specified endpoint information and recipient verification information is received. Access to the selected electronic content is selectively granted based on whether the recipient verification information matches the transmitted verification code.

Example 19 is the method of any or all previous examples and further comprising storing the recipient-specified endpoint information.

Example 20 is the method of any or all previous examples and further comprising notifying the sharer of the recipient-specified endpoint information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system configured to provide access to electronic content, the computing system comprising:
 a processor;
 memory coupled to the processor and containing instructions that when executed provide a user interface component, a link generation component, and an access control component; and
 a data store coupled to the processor and configured to store the electronic content;

the user interface component being configured to receive user input requesting creation of a sharing link relative to selected electronic content stored in the data store, the user interface component being further configured to receive an indication that endpoint verification will be required for the sharing link;
wherein the link generation component is configured to responsively generate and provide a pseudo-anonymous sharing link relative to the selected electronic content, and
wherein the access control component is configured to:
receive endpoint information provided by a recipient of the pseudo-anonymous sharing link, the received endpoint information being associated with a request by the recipient to access the selected electronic content using the pseudo-anonymous sharing link;
perform the endpoint verification using the endpoint information;
provide the access to the selected electronic content based on the endpoint verification; and
track usage of the pseudo-anonymous sharing link based on the received endpoint information.

2. The computing system of claim 1, wherein the selected content includes at least one of;
an electronic file, or
a folder.

3. The computing system of claim 1, wherein the instructions provide a messaging component configured to transmit the pseudo-anonymous sharing link to a first user, and the recipient comprises a second user other than the first user.

4. The computing system of claim 1, wherein
the instructions provide a messaging component;
the user interface component is configured to:
receive recipient input from the recipient, the recipient input including the endpoint information that identifies a communication endpoint associated with the recipient;
the messaging component is configured to:
transmit a verification code to the communication endpoint associated with the recipient, and
receive a communication that includes the verification code; and
the access control component is configured to:
perform the endpoint verification based on the communication including the verification code.

5. The computing system of claim 1, wherein endpoint verification includes email verification.

6. The computing system of claim 1, wherein the instructions provide a messaging component configured to transmit the pseudo-anonymous sharing link to the recipient.

7. The computing system of claim 1, wherein the user interface component is further configured to receive input requesting tracking of the pseudo-anonymous sharing link.

8. The computing system of claim 1, and further comprising a messaging component configured to provide a notification to a sharer of the selected electronic content when the pseudo-anonymous sharing link is used.

9. The computing system of claim 8, wherein the notification is indicative of the pseudo-anonymous sharing link being used successfully to access the selected electronic content, and Wherein the notification includes the endpoint information provided by the recipient.

10. The computing system of claim 9, wherein the endpoint information includes an email address of the recipient.

11. A computing system configured to provide access to electronic content, the system comprising:

a processor;
memory coupled to the processor and containing instructions that when executed provide a user interface component, an access control component, and a messaging component;
a data store coupled to the processor and configured to store the electronic content;
the access control component being configured to receive a pseudo-anonymous sharing link from a recipient and responsively provide an endpoint verification challenge to the recipient;
the user interface component being configured to:
receive recipient input from the recipient, the recipient input being indicative of recipient endpoint information that identifies a communication endpoint associated with the recipient, and
receive verification information input from the recipient;
wherein the messaging component is configured to:
transmit a verification code to the communication endpoint associated with the recipient; and
wherein the processor is configured to compare the verification information input received by the user interface component with the verification code transmitted by the messaging component and selectively grant access to shared electronic content based on whether the verification information input matches the verification code transmitted by the messaging component.

12. The computing system of claim 1 wherein the endpoint information includes an indication of endpoint type.

13. The computing system of claim 12, wherein the endpoint information also includes endpoint address information.

14. The computing system of claim 12, wherein the recipient endpoint information comprises an email address of the recipient.

15. The computing system of claim 14, wherein the endpoint information includes an email address and wherein the messaging component is configured to transmit the verification code as an email to the email address.

16. The computing system of claim 11, wherein the access control component is configured to maintain a listing of endpoints verified with respect to the pseudo-anonymous sharing ink.

17. The computing system of claim 16, wherein the messaging system is configured to transmit a notification indicative of the endpoint information.

18. A method of providing access to shared electronic content, the method comprising:
receiving sharer input indicative of selected electronic content;
generating a pseudo-anonymous sharing link with respect to the selected electronic content;
after sending the pseudo-anonymous sharing link to a recipient user, receiving, from the recipient user, a request to access the selected electronic content using the pseudo-anonymous sharing link;
in response to receiving the request, requiring the recipient user to specify endpoint information;
transmitting a verification code based on the recipient-specified endpoint information;
receiving recipient verification information; and
selectively granting access to the selected electronic content based on whether the recipient verification information matches the transmitted verification code.

19. The method of claim 18, and further comprising storing the recipient-specified endpoint information.

20. The method of claim 18, and further comprising notifying the sharer of the recipient-specified endpoint information.

* * * * *